United States Patent
Hartman et al.

(10) Patent No.: US 7,185,845 B1
(45) Date of Patent: Mar. 6, 2007

(54) FACETED BALL LENS FOR SEMI-ACTIVE LASER SEEKER

(76) Inventors: Richard Leon Hartman, 1103 Deborah Dr., Huntsville, AL (US) 35801; Randall Wayne Griffin, 158 Deerhaven Cir., Gurley, AL (US) 35748

( * ) Notice: Subject to any disclaimer, the term of this patent is extended or adjusted under 35 U.S.C. 154(b) by 151 days.

(21) Appl. No.: 11/037,927

(22) Filed: Jan. 18, 2005

Related U.S. Application Data (60) Provisional application No. 60/536,928, filed on Jan. 16, 2004.

(51) Int. Cl.
  *F42B 15/01* (2006.01)
  *F41G 7/00* (2006.01)

(52) U.S. Cl. .................. 244/3.16; 244/3.1; 244/3.11; 244/3.13; 244/3.15

(58) Field of Classification Search .......... 244/3.1–3.3; 356/140–149; 73/178 R; 250/201.1, 203.1–203.7, 250/206–206.3
See application file for complete search history.

(56) References Cited

U.S. PATENT DOCUMENTS

| | | | |
|---|---|---|---|
| 4,286,760 A | * | 9/1981 | Couderc et al. ........... 244/3.16 |
| 5,319,968 A | * | 6/1994 | Billing-Ross et al. ..... 73/178 R |
| 5,319,969 A | * | 6/1994 | Billing-Ross et al. ..... 73/178 R |
| 5,348,249 A | * | 9/1994 | Gallivan .................... 244/3.11 |
| 6,507,392 B1 | * | 1/2003 | Richards et al. ......... 356/141.5 |

OTHER PUBLICATIONS

Carboni, Georgio, A Glass Sphere Microscope, http://www.funsci.com, Fun Science Gallery Web Site, Fig. 3.
Barry, John R., and Joseph M. Kahn, Link Design for Nondirected Wireless Infrared Communications, Applied Optics, vol. 34, No. 19, Jul. 1995, Fig. 4.

* cited by examiner

*Primary Examiner*—Bernarr E. Gregory
(74) *Attorney, Agent, or Firm*—Mark Clodfelter (57) ABSTRACT

A wide field-of-view optical system that may be used in determining a direction to a source of light, or for determine steering corrections to direct a vehicle toward a target, is disclosed. The optical system, which may be used as a seeker in a missile or other weapon, comprises a spherical ball lens truncated to provide one or more facets on which detectors may be mounted to measure relative intensities as a blur spot image of a source of light, which may be a reflection from a laser designated target, moves across the detectors, which may be individual elements in a quadrant detector. Narrow band filters may be used to suppress undesired wavelengths and enhance performance. The innovative design enables implementation of a wide field-of-view seeker with no moving parts. The spherical ball lens may be used directly as an aerodynamic surface without a need for a separate optical dome.

20 Claims, 7 Drawing Sheets

FACETED BALL LENS FOR SEMI-ACTIVE LASER SEEKER

CROSS REFERENCE TO RELATED APPLICATIONS

This application claims the benefit of provisional U.S. patent application No. 60/536,928, filed Jan. 16, 2004.

FIELD OF THE INVENTION

This invention relates generally to tracking systems, and particularly to a semi-active laser seeker wherein a ball lens is used for collecting of energy provided to a tracking detector.

BACKGROUND OF THE INVENTION

The semi-active laser seeker is a mature technology used in various guided bombs, the HELLFIRE and COPPERHEAD missiles. In this technology, a laser designator shines a spot of laser light on the target. The seeker optical system collects laser energy reflected from the target and places it on a quadrant detector. The location of the laser spot in the field of view, and thus the location of the target, is determined by the ratio of energy on different quadrants of the detector.

The shortcoming of this technology is that for a reasonable field of regard, laser seekers in the current art are placed on a mechanical gimbal, which results in significant costs and potential reliability issues due to complexity and moving parts. Attempts to do strapdown seekers without gimbals results in the field of regard and the field of view being the same, and such seekers typically work only in narrow fields of view.

The range at which a target is detected depends on energy collected, but wide fields of view in conventional optics result in small optics, thus small amounts of energy is collected resulting in shorter detection ranges. Attempts to make the optics large result in more optical aberrations for off-axis targets. Here, the spot on the detector representative of a target becomes increasingly blurred as the spot moves toward the edge of the optics, decreasing energy on the detector. Such a change in energy with increasing angle is known as the "transfer curve", and can become very small with increasing angle. This results in high angular noise.

The instant invention provides a novel and unobvious, yet simple and elegant, solution to these problems by providing a combination of a wide field of view and an energy collection capability that is nearly independent of viewing angle over the field of view of the optical system. These enhanced capabilities are provided in a seeker assembly that may be implemented as a strapdown sensor with no moving parts, thus offering substantial benefits in decreased costs and increased reliability.

DETAILED DESCRIPTION OF THE DRAWINGS

Figure 1:
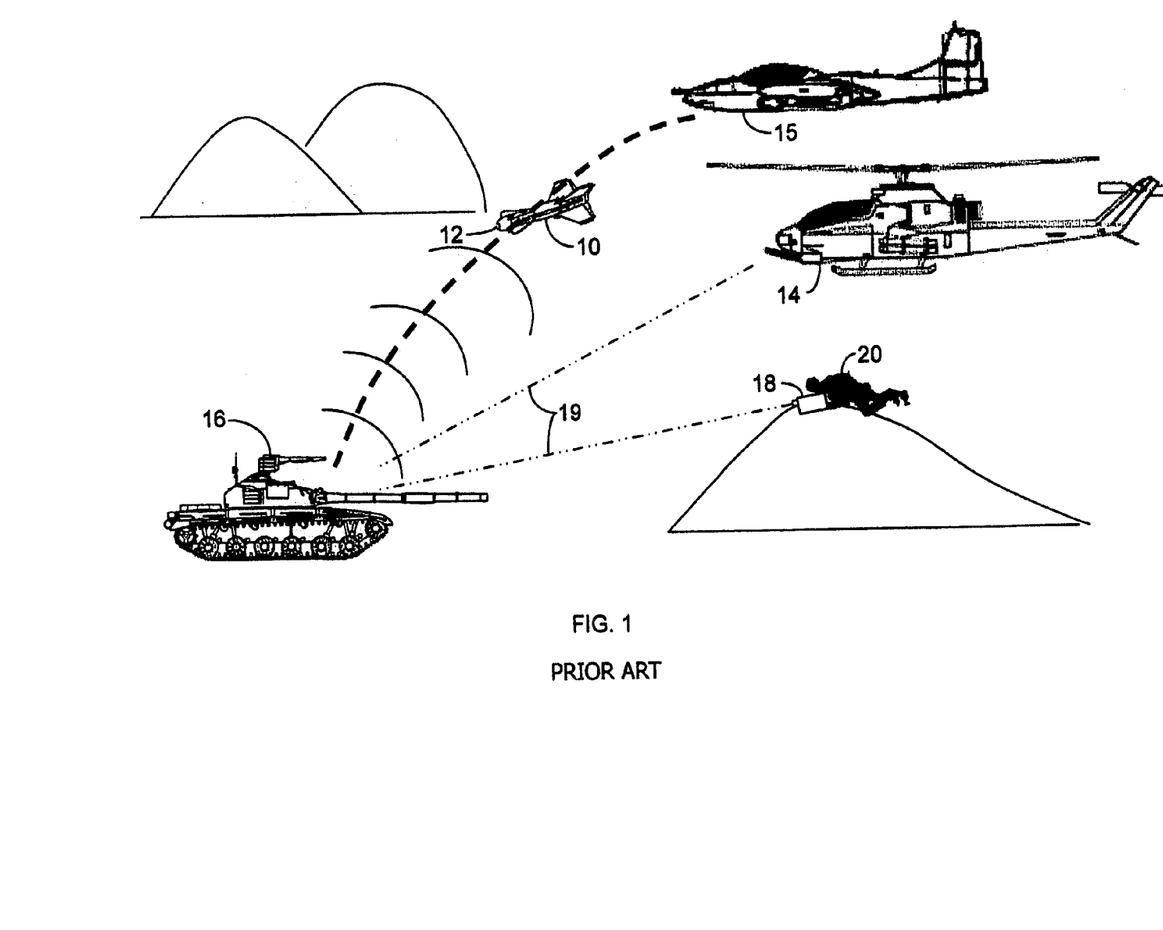
FIG. 1 is an overview of typical applications of a laser seeker.

FIG. 1 is an illustration depicting use of a weapon 10 employing a semi-active laser seeker 12 to obtain high accuracy in steering to a target 16 which has been illuminated, or "designated" by a laser designator 18. The laser designation may be provided by a soldier 20 in a vicinity of a target, by a separate "target spotter" aircraft 14, or by a pilot or weapons officer in an aircraft 15 launching a weapon that employs a laser seeker. As indicated by the dashed lines, the laser beam 19 used to designate a particular target 16 may be encoded or otherwise modulated to provide a signal that can be used so that separate targets in a vicinity can be designated by different beams for near simultaneous strike by different weapons. The encoding can also be used to enhance seeker performance in presence of solar glint or jamming. Either before launch or at a designated time in its flight, a laser seeker 12 in a weapon receives laser photon energy reflected from a designated target 16, and typically directs such photon energy to a quadrant detector within the seeker, where the position of the blur circle of laser energy falling on the quadrant detector creates a different signal in each quadrant of the quadrant detector. These different signals are used to generate an error signal which is then used by a guidance system on a weapon to steer the weapon toward the location of the designated target. Attributes important to overall performance of a weapon system employing a laser seeker include the field of view and the field of regard of the optical system of a seeker. The field of view of an optical seeker is the angular space encompassed in the instantaneous view of a seeker. Such a field of view of a seeker may be a composite of the generally overlapping field of view of individual sectors of a quadrant detector, of individual detectors, or another multipixel detector. The field of regard is typically a larger space over which the instantaneous field of view of a seeker may be scanned by a mechanical mount or gimbal for seeker optics, by a system of one or more mirrors or lens, by a holographic optical element, or by other means. The horizontal and vertical widths of the field of view, or field of regard, of a seeker optical system are key factors in overall performance because wider fields of view or fields of regard allow a weapon to detect reflected light and potentially close on a target with a greater initial angular separation between a weapon heading and the target. As stated, a field of regard wider than a sensor instantaneous field of view is typically obtained by use of additional components, typically including mechanical components, to support scanning, and also requires a trade-off between time to complete a scan or a commensurate loss in probability of detection of energy from a target. A strapdown seeker, which only uses a field of view of the sensor, avoids the reduced reliability associated with use of additional scanning components, but generally at a loss of field of regard. The field of view and field of regard are generally the same in a strapdown seeker.

Although this same principle for generating an error signal for steering could be used with a non-coherent light source, such as a spotlight used to "designate" a target, the tighter beam of a laser is used to provide more energy on a target, and the narrow band of laser wavelengths received at a seeker permit a narrow band bandpass filter to be used in the optical path of a seeker, thereby suppressing out-of-band energy arriving at a detector, thus enhancing the signal-to-noise ratio for detection and use of energy reflected from the designated target. Of course, it should be apparent that a seeker system could also be used with a self-illuminating target, i.e., a target with a light source, such as infrared light.

Figure 2:
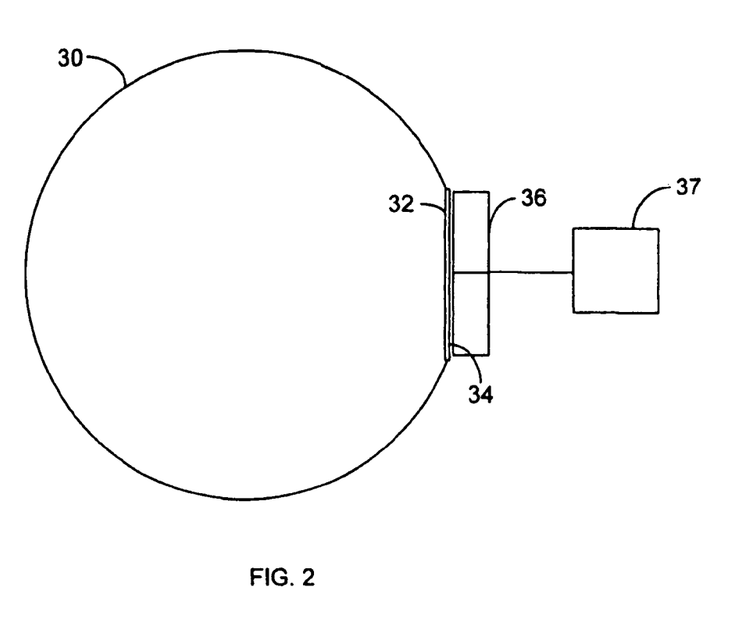
FIG. 2 provides one view of a truncated ball lens assembly of the instant invention.

FIG. 2 shows an overview of a typical embodiment of a seeker of the instant invention comprising a spherical ball lens 30, also referred to in the literature and hereinafter as a spherical lens or a ball lens, truncated at 32 where the envelopes of ray bundles, or blur spot images, from the limiting lines of sight just touch each other. A narrow band bandpass filter 34 is typically attached or deposited on a flat truncated surface, or facet, of the ball lens 30, deposited on a front face of a plurality of light detectors 36, which may be a quadrant detector, or integrated as a separate element between a facet of a ball lens 30 and a detector. A plurality or assembly of detectors 36, which may be integrated as a quadrant detector, is placed adjacent to narrow band filter 34 so as to receive filtered light, or photon energy, from lens 30. A quadrant detector is typically an assembly of four adjacent individual detectors from which individual signals from individual detectors may be obtained according to photon intensity falling on each detector. Additional coatings or thin layers of materials may be added between optical elements as is conventional practice to match optical indices and help provide a uniform optical path between elements. A signal processing element or control system 37 coupled to detectors 36, which may be individual elements of a quadrant detector.

In an embodiment tailored for a particular application, size of ball lens 30 is determined by the desired field of view, the size of the assembly of detectors 36, and the index of refraction of the ball lens material.

Figure 3:
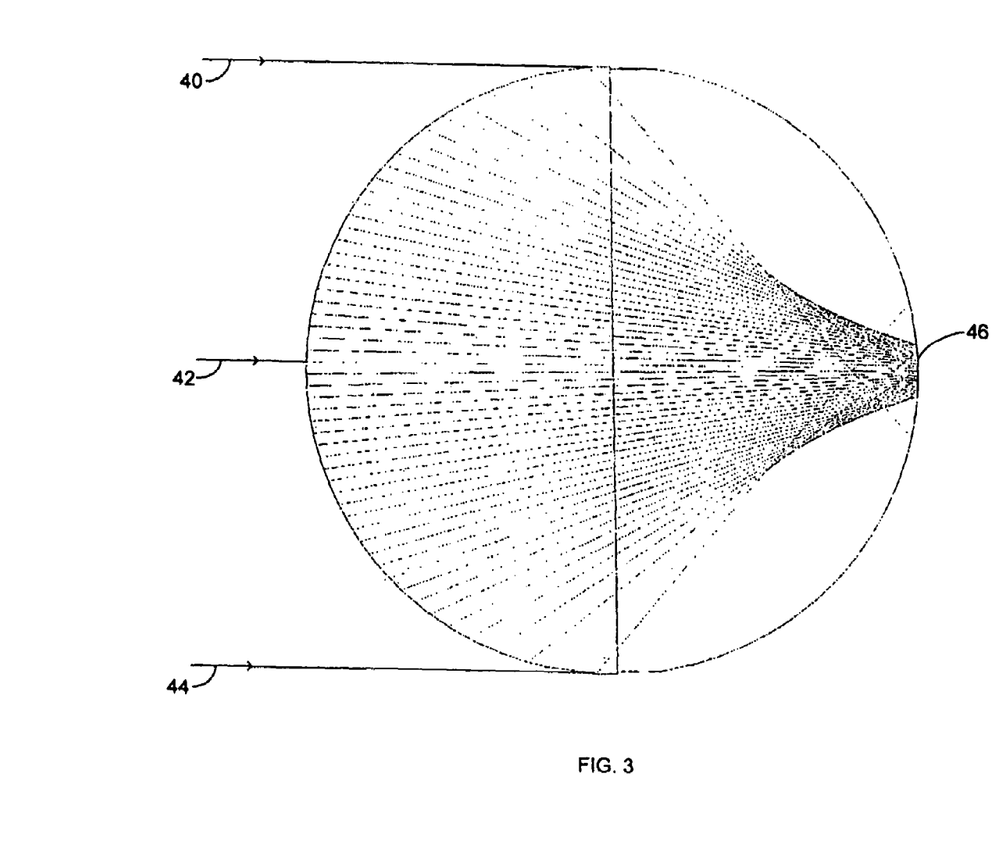
FIG. 3 is a ray trace diagram showing the optical performance of a ball lens.

FIG. 3 shows representative paths of rays of light, or photons, entering spherical ball lens 30 for a given index of refraction of the ball material. Nearly parallel rays of light 40, 42, 44 from the target enter ball lens 30, and are refracted as shown, typically coming to an imperfect focus near the back surface 46. Assuming the material of which the spherical ball lens 30 is made has a uniform optical index, the ray paths within the ball lens 30 are the same, relative to the incoming line of sight, for any line of sight angle of the rays entering the sphere. Note that this is not the case for a more conventional, non-spherical lens. A spherical lens is normally used with a curved focal plane. In some embodiments of the instant invention, however, the sphere is truncated to a flat surface 32 (FIG. 2), with a position selected as explained below.

Figure 4A:
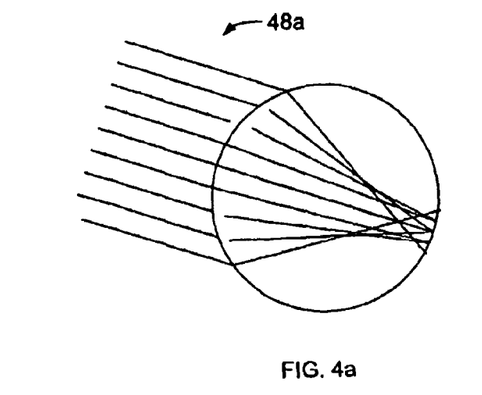
FIGS. 4a, 4b, 4c, and 4d show how a ball lens may be truncated as in the instant invention to provide a wide field of view on a quadrant sensor.
Figure 4B:
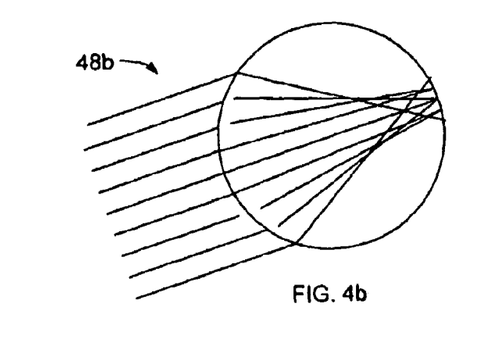
Figure 4C:
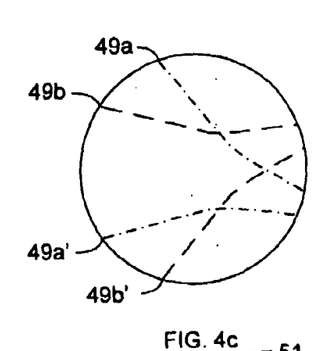
Figure 4D:
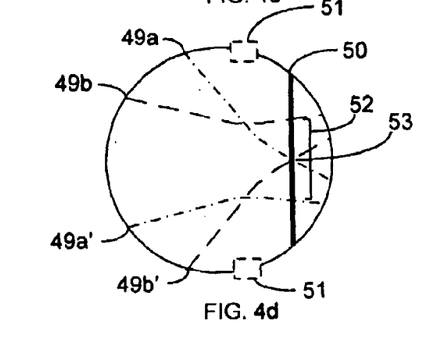

FIGS. 4a and 4b illustrate representative ray paths, also called ray path bundles 48a, 48b, for light coming from targets placed at the desired extreme limits of viewing angle, relative to a central angle, the central angle typically called the seeker boresight, and which is located midway between the extreme angles desired for a particular seeker. FIG. 4c illustrates envelopes 49a, 49a', and 49b, 49b', of rays at the limits of these ray path bundles 48a, 48b, respectively, and FIG. 4d illustrates that there is typically a plane 50, perpendicular to the central ray path or boresight, where the envelopes 49a, 49a', and 49b, 49b' of optical ray bundles, or blur spot images, created by photons from targets at extreme limits of the viewing angles, are registered within an area 52 of plane 50. Since, for some embodiments of the instant invention, the best operation of a quadrant detector is obtained when the photon energy in a blur spot image from a target moves continually between the sectors of a quadrant detector, and moves onto only one quadrant when a target is just at the edge of the field of view, the truncating plane or facet 50 is placed perpendicular to the boresight direction at the point of intersection 53 of the ray bundles from the extreme edges.

For embodiments of the instant invention implemented with only a single facet as illustrated in FIGS. 2 and 4d, the diameter of the ball lens is typically sized so that maximum dimension across a truncation facet 50 is equal to, or slightly greater than, a corresponding dimension of an active area of detector assembly 36 (FIG. 2) for the desired maximum field of view.

Still referring to FIG. 2, and as stated, filter 34 is typically a narrow band bandpass filter, which may be a dichroic or interference filter, also called a line filter, implemented either as a separate component, or deposited as by vapor deposition on truncated surface 32, deposited on detector assembly 36, or implemented as a separate component, the filter passing only a narrow band of wavelengths surrounding a central wavelength of laser light emitted by a laser designator used in that particular application. The narrow-band bandpass filter 34 blocks other undesired wavelengths of radiation to which sensors in sensor assembly 36 might otherwise respond, thereby enhancing signal-to-noise ratio of the detector for the desired laser designator wavelength. (As stated earlier, laser designators and seeker detection circuitry also typically employ various laser signal encoding or modulation techniques to reduce likelihood that a seeker will respond to an unintended light source, such as a reflection from the sun, and to permit separate designation of different targets in a vicinity for near simultaneous strike by different weapons). The signal on the detector is processed in the conventional manner of a quadrant detector to determine a direction to a target location or to obtain signals used to steer a guided vehicle toward a target.

Significantly, and as one feature of the invention, the transfer curve of the quadrant processed signal, from a ball lens seeker of the instant invention implemented as illustrated in FIGS. 2 and 4d, as a function of angle is nearly linear, unlike conventional optics where the change in signal becomes virtually undetectable at wide angles corresponding to light designating the target being received or registered near an edge of the optical system. In Applicant's invention, the transfer curve can be tailored to even be more sensitive near the edges of the field of view by slight adjustments in the selection of the position of the truncation plane along the boresight ray path. This can be advantageous in some weapon systems where the target is usually not in the center at the longest ranges. By tailoring the position of the truncation plane and detector, the reflected energy collected can be enhanced at the edges of the field of view and reduced in the center. As the weapon approaches the target, the energy collected gets greater, and the weapon trajectory is adjusted to bring the target near the center of the field of view.

Although a single facet embodiment of the instant invention, as illustrated in FIGS. 2 and 4d offers a significant improvement over current art in simultaneously providing a wider field of view and enhanced energy collection, there are some limitations in a single facet embodiment that may be overcome by using additional facets.

One disadvantage of a single facet implementation is that, depending upon the index of refraction of the material used for the truncated ball lens, angle of incidence at the truncated surface can approach angles that lead to total internal reflection for targets located at wide angles with respect to sensor boresight, and thus loss of signal transfer from the ball lens to the interference filter or detector for targets at wide angles. Although this effect may be mitigated to some degree by use of index matching coatings, gels, or fluids, other aspects of the instant invention, namely the use of multiple facets as described further herein, offer additional improvements in field of view and overall seeker performance.

Another disadvantage of the very wide field of view seeker is that there may be more sunlight in the field of view. In addition, in an embodiment as illustrated in FIG. 2, the laser line filter bandwidth must be greater to allow a wider spread of angles impinging on the filter. The result is increased transmittal of undesired wavelengths, resulting in increased noise and decreased effective range in the presence of sunlight.

Figure 5A:
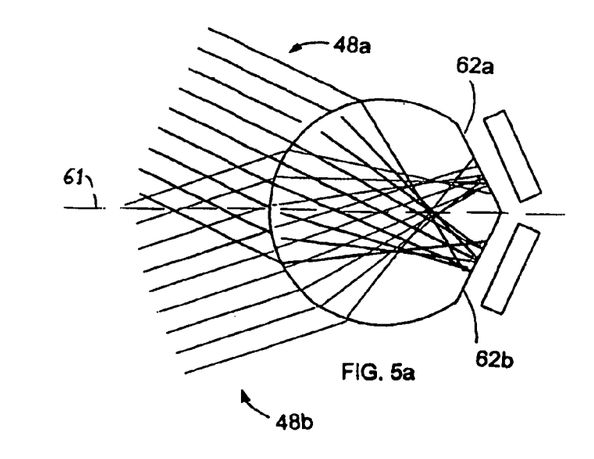
FIGS. 5a, 5b, 5c, and 5d illustrate an alternate embodiment of the instant invention for enhanced performance at even wider field of view.
Figure 5B:
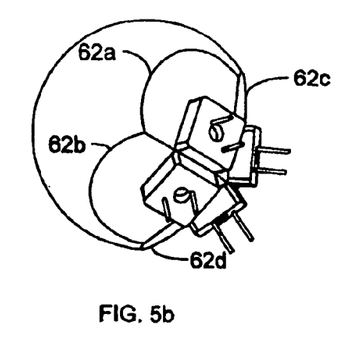
Figure 5C:
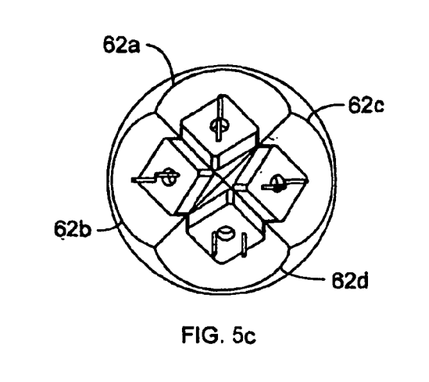
Figure 5D:
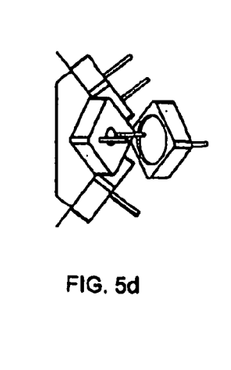
Figure 6A:
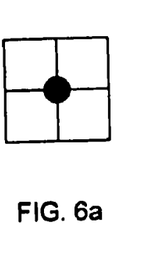
FIGS. 6a, 6b, 6c, 6d, and 6e illustrate alternate embodiments of detector assemblies that may be used in embodiments of the instant invention
Figure 6B:
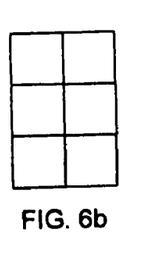
Figure 6C:
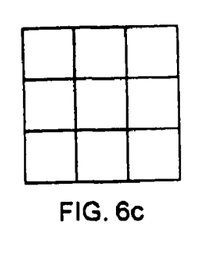
Figure 6D:
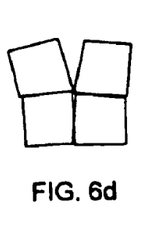
Figure 6E:
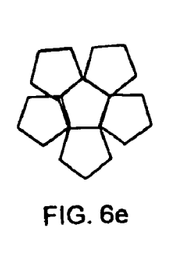

FIGS. 5a through 5d show an alternate embodiment wherein there are a multiplicity of truncated surfaces or facets, e.g., facets 62a, 62b, 62c, 62d. As shown in FIG. 5a, with the ray envelopes 48a, 48b of FIGS. 4a, 4b superimposed with respect to facets 62a, 62b, it is seen that light rays within envelopes 48a, 48b are refracted so as to be generally perpendicular to a plane of facets 62a, 62b (see FIG. 3 for a more accurate refraction envelope). In effect then the angles at which the facets lie with respect to a boresight line 61 determines the extent of the field of view. In this example, and as shown, the ray envelopes 48a, 48b are angled about 30 degrees with respect to each other, with the blur circles falling almost perpendicularly onto facets 62a, 62b. As such, this embodiment has a minimum fieod of view of 30 degrees. A maximum field of view would depend on refractive properties of a material from which the ball is constructed and the number and orientation of the sensors. If there are four facets, four independent detectors may be coupled to operate in a manner similar to a quadrant detector. In addition, the spread of angles of incidence on each facet, and thus each filter and detector, is less, allowing a narrow band laser line filter to be implemented separately on each facet or on each detector. Since the angles of incidence on each facet are less than in the case of a single facet embodiment as illustrated in FIGS. 2 and 4d, the seeker field of view can be wider without the rays beginning to suffer total internal reflection near the edges of the truncated surface. Thus, while in a conventional seeker design, or even, to some extent, for a single truncation plane embodiment of the instant invention, detectors receive only a weak signal on a detector plane for a target at an extreme field-of-view from boresight, in a four-facet design, detectors on one or two facets will be more nearly perpendicular to a line of sight from a target at an extreme field of view, thus providing a greater sensitive range for such targets and also supporting generation of a stonger differential steering correction for such targets. In view of the foregoing, it should be apparent that a ball lens of Applicant's design, particularly with multiple facets and associated detectors, may be mounted as a strapdown sensor without loss of field of view and, as noted above, without the associated costs of a gimbal or other more expensive mounting arrangement used to obtain a wider field of view.

Although references have been made earlier herein to selection of a location for a truncation plane for a single facet embodiment of the instant invention, representative methods by which locations for truncations of single and multi-facet embodiments are explained further below.

The size and location of facets, particularly in a multi-facet embodiment, may be determined graphically or by use of an optical design program. In a graphical approach, a ray trace, for a particular index of refraction of a candidate material, for a unit diameter ball, is generated, as in FIG. 3. The ray trace diagram is rotated by ½ of the desired FOV, and then repeated at −½ of the desired FOV, as in FIGS. 4a and 4b. A plane of truncation 50 is then defined by the intersection 53 (FIG. 4d) of the outermost rays. The distance along a line in truncation plane 50 from the top outermost ray in ray bundle envelope 49b, 49b' to the bottom outermost ray in ray bundle envelop 49a, 49a' is measured. This is the active region diameter in truncation plane 50 for that FOV. The design diameter of the desired ball is now taken as the unit diameter times the ratio of detector diameter, for a desired detector, to the active region diameter in the unit ball. The location of truncation plane 50 is measured, e.g., in centimeters toward the center from an outer diameter of the unit ball, and multiplied by the same ratio to determine the location of the truncation, e.g., in centimeters toward the center from an outer radius of the desired ball. Thus the design diameter of the desired ball and the location of the truncation depend on the FOV, the index of refraction, and the size of the detector.

A similar process may be followed using an optical design program, with specific procedures depending on the specific design program used. A principle of an optical design program is that an optical design program will typically offer greater accuracy and will more easily take into account total internal reflection at the truncation surface, resulting in a change in the shape of the spot exiting the truncated ball lens at the truncation surface, and will thus more accurately predict performance of a truncated ball lens at the edges of the field of view. In practice, at fields of view on the order of ±30°, it generally becomes necessary to truncate the ball further than indicated by a graphical design design approach, resulting in some overlap at the innermost rays, in order to still have rays fall on the detector from a target at the edge of the FOV.

Applicants have found that a similar process may be used to select truncation planes for an embodiment having multifaceted truncation. In the case of a four faceted system, the facets form a pyramid. The peak of the pyramid is preferably located in plane 50. The facets are at 90∇+½ FOV and 270∇−½ FOV, in both horizontal and vertical planes. The size of the facets is determined by drawing and measuring a line, through the peak in plane 50, perpendicular to the line of sight, or central ray, from a target located at ½ FOV, i.e., the desired extreme angle, on the opposite side of the ball lens from a facet. This is the active region of one facet. The ball and facet sizes are determined by multiplying the unit ball diameter by the ratio of the detector size to the measured facet on the unit ball.

The approaches described above for selection of locations and angles for truncation planes are intended as guidance only and may be tailored to meet specific needs, or optimize performance, of a given embodiment.

Multi-faceted and multi-detector embodiments may be extended further, using additional facets and detectors in arrangements such as illustrated in FIGS. 6a through 6e. For example, electrical outputs from six (6) detectors in a pentagonal close packed array as in FIG. 6e can be processed three or four at a time like a quadrant detector. The field of view observed by each individual detector (i.e., pixel) is now less, resulting in less sunlight in the field of view of any given detector and also allowing use of narrower laser line filters. Such embodiments can also be used to improve range by increasing the size of the ball lens or decreasing the effect of sunlight, or such embodiments may be used to increase the total field of regard. These alternate embodiments may be aided, for example, by use of individual detectors mounted on a flexible substrate material, or by use of detectors which are themselves flexible.

For those embodiments and applications where it is desirable to determine an angle or direction to a target, as distinguished from simply generating signals which may be used to steer a vehicle, a truncated ball lens and detector assembly may be calibrated in terms of the outputs from individual sensors versus a direction to a target. Although such a calibration may be accomplished based on calculations, as from a ray trace program, an empirical calibration for a given truncated ball lens and detector assembly will likely yield more accurate results. Such a calibration may be performed, for example, by moving a small light source of constant and known intensity, and preferably at the wavelength, or wavelengths, at which the truncated ball lens and detector assembly will be used, about an arc in a plane, e.g., a horizontal plane, that includes the boresight of the truncated ball lens and detector assembly, while recording the output from each individual detector, or a composite output from one or more bridge circuits, as may be used to join pairs of detectors, corresponding to a series of discrete positions of the small source of light. These measurements may then be repeated as the light source is moved in different planes, e.g., a vertical plane, and planes at incremental tilts of 5 to 15 degrees. Results of these calibration measurements may then be used to construct analytical curve fits, or table lookup procedures, that may be implemented in software to yield a direction to a light source based on outputs from a plurality of detectors used in conjunction with a truncated ball lens assembly.

Figure 7:
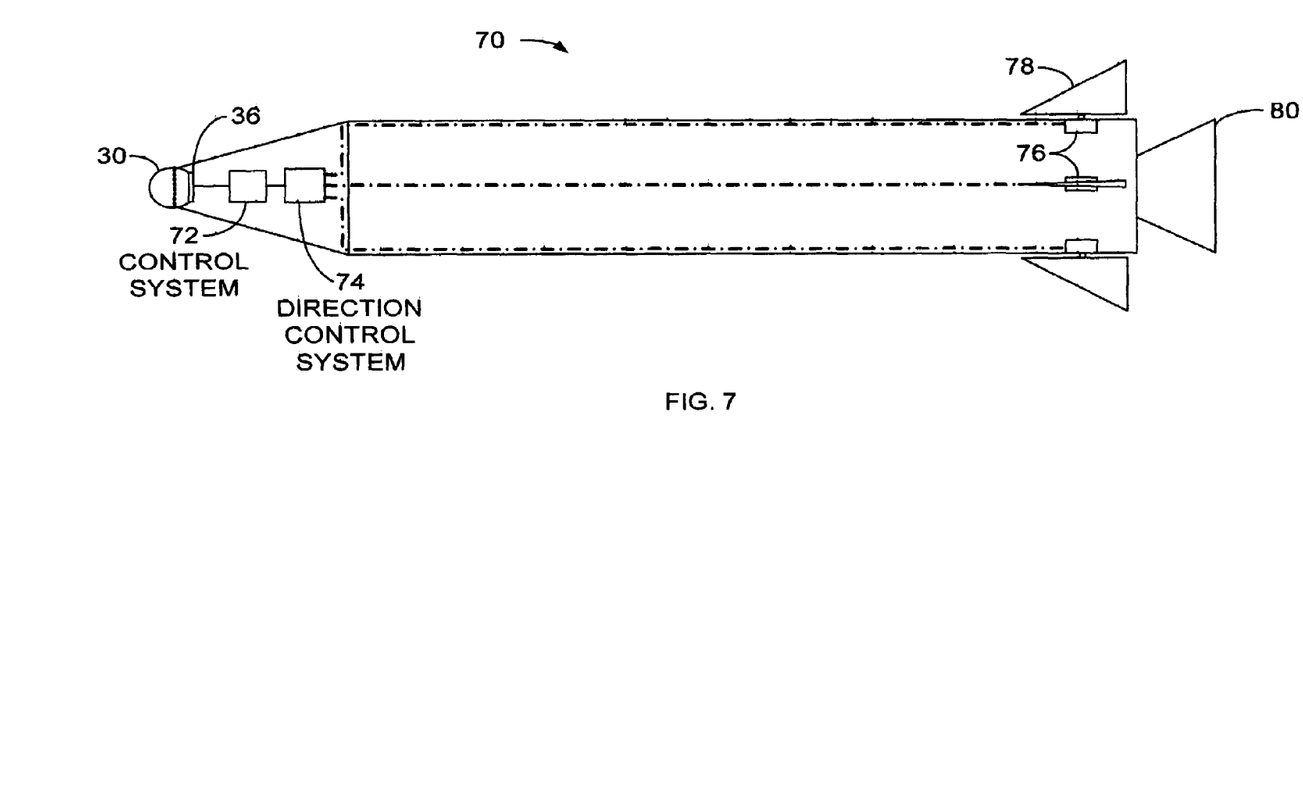
FIG. 7 illustrates how an embodiment of the instant invention could be used with a guided vehicle.

As yet another feature of the invention, the ball lens itself can form the outer, exterior dome of a missile or bomb system, as illustrated in FIG. 7, thus eliminating need for a separate dome shaped window covering the optical and sensor system.

There are regions such as region 51 (FIG. 4d) around the periphery of the ball through which no light rays pass from the target to a detector. These regions 51 may be flattened for bonding or otherwise shaped for mounting the ball lens in place, for example, a retaining groove may be cut or etched for mechanical fastening.

The features and characteristics noted above for a ball lens, i.e., use as an outer aerodynamic surface rather than requiring a separate aerodynamic dome, and use of a region 51 around a periphery of a ball lens for mounting, also allow a ball lens to be used as an integral part of the electromagnetic shield for a vehicle. In such an application, an optically transmissive but electrically conductive coating may be applied to a forward portion, or a rear portion, including facets, of a ball lens, with a periphery of such a coated section being bonded to a conductive frame supporting such a ball lens so as to serve as an integral portion of the electromagnetic shielding of a vehicle. Alternatively, a ball lens may be constructed of two portions, e.g., hemispheres, with a screen mesh made of fine wires spaced with a separation that permits good optical transmission, but which causes the mesh to appear much like a conductive solid to electromagnetic wavelength (e.g., typical EMI frequencies) for which shielding is desired. The edges of such a mesh could then be secured around the mounting regions 51 of a lens and bonded to a conductive mounting frame in a vehicle to help maintain shielding integrity of the vehicle against electromagnetic threats.

A truncated ball lens of the instant invention may be formed by grinding and polishing a full ball and cutting the ball to form facets, or by casting in final shape, or by attaching a half ball (a hemisphere) to a cylinder or prism with an appropriate number of facets.

In practice, in a guided vehicle application as illustrated in FIG. 7, or in any other guided application, a ball lens, assembly 30 of the instant invention may typically be mounted in a forward section of a guided vehicle 70, and detector assembly 36 used in conjunction with the ball lens assembly coupled to a navigation computer or control system 72, which will receive signals from detector assembly 36 that will be used to calculate a direction to a target using methods such as found in the literature and textbooks for use with quadrant detectors and other steering sensors. An output from a navigation computer or control system is provided to a vehicle direction control system 74, which may be a flight control system, which generates appropriate control commands or signals to steering actuators 76 for fins 78, or to other vehicle steering devices, including such devices as a gimbaled nozzle 80, or a thrust vector control system in flight vehicles, or steerable wheels, tracks, or rudders, in embodiments including ground vehicles or water vehicles.

While the instant invention is shown and described primarily in conjunction with an airborne ballistic vehicle, it should be apparent that other systems, such a space docking systems, and robotic systems may find benefit from Applicant's invention.

Having thus described our invention and the manner of its use, it should be apparent to those skilled in the relevant arts that incidental changes may be made thereto that fairly fall within the scope of the following appended claims, wherein

We claim:

1. A faceted ball lens assembly for an optical seeker system comprising:
   a spherical ball lens having a front region and a rear region, with a boresight line defining a center of a field of view of said faceted ball lens assembly and extending through said spherical ball lens, said spherical ball lens being truncated at said rear region to create at least one facet, with rays of light from a target entering said front side and being imperfectly focused at said facet into a blur circle by said ball lens,
   a blur circle detector attached to said at least one facet of said spherical ball lens, said blur circle detector being sensitive to position and movement of said blur circle thereon and providing an electrical output representative of said position and movement of said blur circle on said blur circle detector,
   a locating system responsive to said electrical output representative of said position and movement of said blur circle from said blur circle detector, for determining location of said target with respect to said faceted ball lens assembly.

2. The faceted ball lens assembly of claim 1 further comprising at least one optical filter disposed between said at least one facet of said spherical ball lens and said blur circle detector.

3. The faceted ball lens assembly of claim 2 wherein said rays of light from said target are developed by a laser designator.

4. The faceted ball lens assembly as set forth in claim 2 wherein a plane of truncation at said rear region of said ball lens to form said at least one facet is defined generally by an intersection of rays of light entering said ball lens from a plurality of points at about an extreme outer edge of said field of view.

5. The faceted ball lens assembly of claim 4 wherein said at least one optical filter is a narrowband filter that transmits only a small band of wavelengths surrounding a selected wavelength.

6. The faceted ball lens assembly as set forth in claim 4 further comprising a plurality of said facets at said rear region of said spherical ball lens, and a plurality of light detectors, one of each said light detectors coupled to a respective said facet, each said facet of said facets positioned to a one side of said boresight line and angled so as to generally perpendicularly receive light rays entering said spherical ball lens from a said front region of said spherical ball lens on an opposite side of said boresight line, thereby widening said field of view, with said plurality of light detectors functioning together to track a blur circle of said laser light from said target as said blur circle or portion of said blur circle moves from one said facet to an adjacent said facet.

7. The faceted ball lens as set forth in claim 6 further comprising 4 facets at said rear region of said spherical ball lens, said 4 facets positioned about said boresight line, each said facet angled to generally perpendicularly receive light rays from a quadrant of said front region of said spherical ball lens on an opposite side of said boresight line, and 4 said light detectors, one of each said light detectors mounted to a respective said facet, with said 4 light detectors functioning together as a quadrant detector.

8. The faceted ball lens of claim 7 wherein said faceted ball lens is mounted as a strapdown sensor with a field of view generally defined by an angle of each said facet with respect to perpendicularity of said light rays from said quadrant of said front region of said spherical lens on said opposite side of said boresight line.

9. The faceted ball lens assembly of claim 1 wherein said blur circle detector is a quadrant detector.

10. The faceted ball lens assembly of claim 1 wherein said control system generates a signal used to steer a vehicle toward said target responsive to said electrical energy representative of said position and said movement of said blur circle.

11. The faceted ball lens system as set forth in claim 10 wherein said vehicle is a missile or bomb, and said ball lens is mounted to said missile or bomb so that said spherical ball lens serves as a forward, outer, exterior dome of said missile or bomb.

12. An optical system for determining a direction to a source of light designating a target and comprising:
  a spherical bail lens having a front region and a rear region, and a boresight line through a center of a field of view of said spherical ball lens, said first region serving as an outer, exterior aerodynamic dome, and said rear region truncated to provide at least one facet, with a plane of truncation of said facet defined generally by an intersection of light rays entering said ball lens at a plurality of points at extreme edges of said field of view,
  a plurality of light detectors forming a blur circle detector coupled to said at least one facet, for receiving a blur circle from said light source as generally focused by said ball lens and providing a signal output representative of position of said blur circle on said blur circle detector,
  at least one light filter between said blur circle detector and said facet, for passing light of a wavelength close to that of said source of light designating said target to said blur circle detector,
  a signal processor coupled to said blur circle detector and using signals from said blur circle detector to determine a direction to said target.

13. An optical system of claim 12 wherein at least one optical filter is disposed between said at least one said facet of said spherical ball lens and said plurality of detectors.

14. An optical system of claim 13 wherein said at least one optical filter is a narrowband filter that transmits only a narrow band of optical wavelengths surrounding a wavelength of said light source designating said target.

15. The faceted ball lens as set forth in claim 14 further comprising a plurality of facets positioned about said boresight line and angled so that each facet of said facets receives light rays in generally perpendicular relation from a portion of said field of view on an opposite side of said boresight line, thereby broadening said field of view to an extent determined by an angle of each of said facets.

16. The optical system as set forth in claim 15 wherein said faceted ball lens is mounted as a strapdown sensor in an airborne vehicle guided to said target by a navigational system coupled to said signal processor.

17. A guided vehicle that steers toward a source of illumination designating a target comprising:
  a truncated spherical ball lens assembly further comprising:
  a spherical ball lens having a front region and a rear region, said front region serving as an outer, front aerodynamic dome for a forward-most portion of said guided vehicle, said rear region being truncated to create at least one facet,
  a quadrant detector coupled with said at least one facet so as to receive energy from photons refracted through said truncated spherical ball lens from said front region of said ball lens,
  a control system coupled to said quadrant detector, said control system monitoring intensity of energy falling on said quadrant detector and determining a direction from which said energy emanates,
  a navigation system coupled to said control system for determining a path of said vehicle based on said direction from which said energy emanates, and
  a direction control system coupled to said navigation system and which uses signals from said navigation system to control steering devices for said vehicle.

18. The guided vehicle as set forth in claim 17 wherein said rear region of said ball lens is truncated to form a plurality of facets, each facet of said facets having a portion of said quadrant detector mounted thereto, and each said facet having an angle with respect to said front region so that the field of view of said truncated ball lens assembly is widened.

19. The guided vehicle as set forth in claim 18 wherein said plurality of facets further comprises 4 facets symmetrically disposed on said rear region, each of said four facets receiving said photons refracted through said ball lens generally from an opposite quadrant of said front region.

20. The guided vehicle as set forth in claim 19 further comprising at least one optical filter between each said facet and a respective said portion of said quadrant detector.

* * * * *